United States Patent Office 2,786,092
Patented Mar. 19, 1957

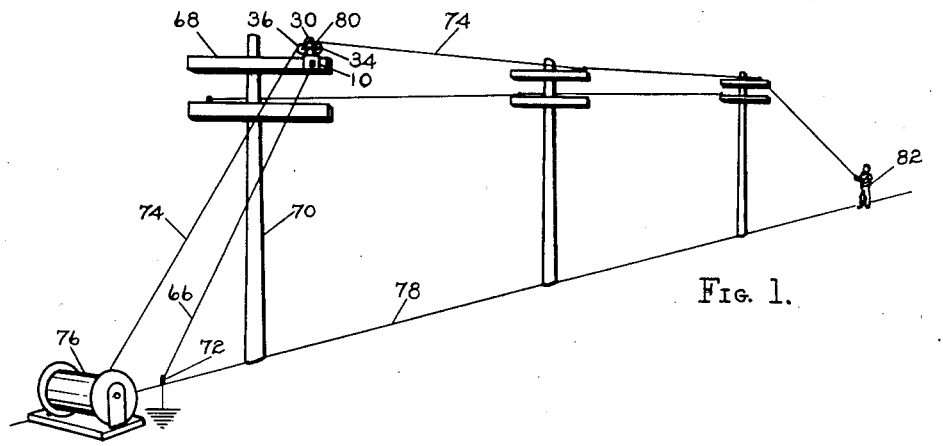
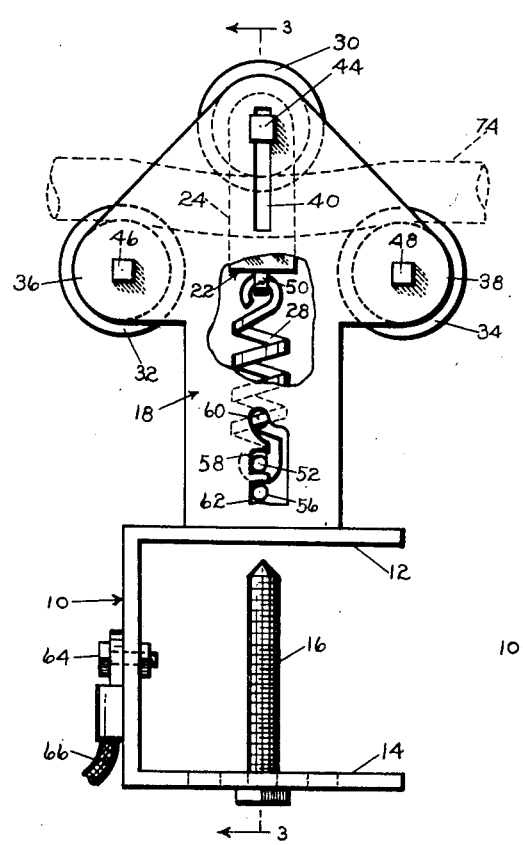
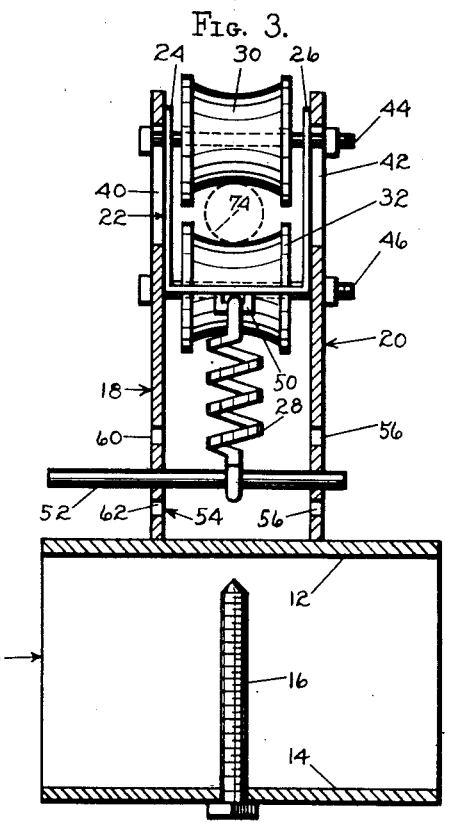

2,786,092

SAFETY GROUNDING DEVICE

Robert W. Gage, Carlsbad, N. Mex.

Application October 12, 1953, Serial No. 385,411

4 Claims. (Cl. 174—5)

This invention relates to safety devices for grounding electric wires and cables as wires and cables are installed on poles to protect workmen from wires being accidentally charged with electricity, such as by lightning or by being crossed with live wires, and in particular a saddle having a C-clamp thereon for mounting the saddle on a cross-arm of a pole, and a ground wire for connecting the saddle to the ground whereby with the saddles positioned on the first and last poles of a series of poles over which wires are being installed workmen at both ends of the series of poles are protected.

The purpose of this invention is to provide means for grounding wires and the like being installed on poles to prevent injury to linemen and other workmen due to the wires becoming accidentally charged with electricity.

Installing electric wires and cables on cross-arms of poles is a hazardous job, particularly when visibility is poor, as old wires, broken branches of trees and other elements drop across wires at unexpected times connecting wires being installed with live wires, and as the wires being installed are not positively connected at any point it is difficult to provide a ground.

With this thought in mind this invention contemplates a saddle having rollers positioned in a triangle therein with one roller positioned between two other rollers and urged toward the other rollers with a spring whereby a wire or cable is free to run through the rollers while gripped thereby to insure positive contact, and the saddle is provided with a C-clamp by which it may be mounted on a cross-arm of a pole, and a ground wire adapted to be connected to a rod driven into the ground.

The object of this invention is, therefore, to provide means for forming a ground connection to wires being installed on poles and the like in which the wires are free to slide through the connection.

Another object of the invention is to provide a ground connection for wires being installed on poles in which wires may readily be placed in and removed from the connecting element.

Another important object of the invention is to provide a device for grounding wires and the like being installed on telephone and telegraph poles in which the device is temporarily connected to the wires so that it may readily be moved from one pole to another and so that one device may be used at each end of an installation.

A further object of the invention is to provide temporary means for grounding wires and the like being installed on poles in which the device may be adjusted to compensate for the size of the wire extended therethrough.

It is a still further object of the invention to provide a device for temporarily grounding wires being installed on poles in which the device is attached to a cross-arm of a pole with a clamp so that it may readily be moved to different positions on a cross-arm.

And a still further object is to provide apparatus for temporarily grounding wires being installed on poles in which the apparatus is of simple and economical construction.

With these and other objects and advantages in view the invention embodies a pair of spaced parallel vertically disposed plates extended upwardly from an upper arm of a C-clamp, a U-shaped slider positioned between the plates, means for resiliently urging the slider downwardly, a roller journaled in the arms of the slider, rollers journaled in extensions at the sides of the plates, and a ground wire extended from the device and adapted to be connected to an iron stake or the like driven in the ground.

Other features and advantages of the invention will appear from the following description taken in connection with the drawings, wherein:

Figure 1 is a perspective view showing wires being installed on a plurality of poles with one wire extended through a grounding device of this invention and with the grounding device connected by a wire to the ground.

Figure 2 is a front elevational view of the improved wire grounding device with part of one of the side plates broken away to show a connection of a spring to a slider in the device, and with the parts shown on an enlarged scale.

Figure 3 is a vertical section through the grounding device taken on line 3—3 of Figure 2.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 8 refers to the invention in its entirety, numeral 10 indicating a C-clamp having an upper arm 12 and a lower arm 14 extended from a back to which the numeral 10 refers, an adjusting screw 16 threaded in the lower arm 14, spaced parallel side plates 18 and 20 extended upwardly from the upper arm 12, a slider having a base 22 with upwardly extended arms 24 and 26, a spring 28 for urging the slider downwardly, an upper roller 30 journaled in the arms 24 and 26 of the slider, and lower rollers 32 and 34 journaled in extensions 36 and 38, respectively, of the plates 18 and 20.

The plates 18 and 20 are provided with aligned vertically disposed slots 40 and 42, respectively, and the ends of a shaft 44 on which the roller 30 is mounted and which is journaled in the arms 24 and 26 of the slider extend through the slots, as shown in Figure 3. The roller 32 is journaled in the extensions of the plates 18 and 20 with a shaft 46 and the roller 34 with a similar shaft, as indicated by the numeral 48.

With the rollers positioned in this manner a wire or cable extended through the saddle is bent slightly, as shown in Figure 2, to insure positive contact of the wire or cable with the rollers. The upper roller is urged downwardly by the spring 28, one end of which is attached to an eye 50 on the base 22 of the slider, and the other to a pin 52 extended through irregular slots 54 and 56 in the plates 18 and 20, respectively. Each of the slots is provided with an intermediate notch 58 in which the pin 52 is shown in full lines in Figure 2, an upper notch 60, and a lower notch 62, whereby with a large cable the pin is positioned in the upper notches 60, with a smaller cable in the intermediate notches 58, and for a small wire in the lower notches 62.

The clamp of the saddle is provided with a terminal 64 to which a ground wire 66 is connected and with the saddle positioned on a cross-arm 68 of a pole 70 the wire 66 is connected to a stake 72 or the like, which may be made of copper, iron, or a suitable material. A conductor, such as the wire or cable 74, is extended from a spool 76 which may be positioned on the ground 78, or on a truck or the like, over the cross-arms and threaded through the rollers of the saddle, which is shown at the point 80. By this means workmen around the spool 76 are protected, and with a similar saddle on the pole at the opposite end a workman, as indicated by the numeral 82, may also be protected.

In use the saddles are positioned on the cross-arms of the poles before the workmen draw the cable from the spool and as the wire, or a cable, is drawn from a spool and positioned on the cross-arms the wire or cable is threaded through the rollers of the saddles so that should the conductor become charged with electricity, as by means of a bolt of lightning striking the conductor, or by the wire swinging into contact with a live or energized conductor while pulling the new wire into place the workman will not become charged with electricity, or injured thereby. Whereas, if the saddle of the safety grounding device is used at the first pole, contacted with the wire being pulled, the reel tenders or other workmen adjacent the spool 76 or reel will be protected, however, the workmen pulling the wire will not necessarily be protected.

It will be understood that workmen, such as the workman 82, while pulling the wire or conductor, normally tie a piece of specially treated rope to the end of the conductor to be pulled and said workman's hands are on the rope and not on the wire or conductor, whereby the workman, such as the workman 82, is normally protected. With the device of this invention the linemen on the poles will be protected as the safety grounding saddle is used on both the first and last poles which support the length of wire being pulled. In other words, two of the safety grounding devices can be and are preferably employed during use. Furthermore, should be a truck be used to pull the wire such as the cable 74, using a take-up reel, the use of the grounding device will protect the workmen around the truck.

From the foregoing specification it will become apparent that the invention disclosed will adequately accomplish the functions for which it has been designed and in an economical manner and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to, in actual practice if desired.

Having now described the invention that which is claimed to be new and desired to be procured by Letters Patent, is:

1. A wire grounding saddle comprising a clamp for mounting the saddle on a cross-arm of a pole, spaced lower rollers mounted in a horizontal plane and positioned in said saddle, an upper roller mounted to coact with the lower rollers, resilient means for urging said upper roller into contact with a cable extended through the saddle and trained over the lower rollers, an electrical conductor extended from the saddle to the ground, and a metallic stake positioned in the ground and to which said electrical conductor is connected.

2. In a device for grounding wires being installed on posts and the like, the combination which comprises a C-clamp adapted to be temporarily secured to a cross-arm of a telegraph pole, spaced parallel plates extended upwardly from said clamp, spaced rollers journaled in said plates, a slider positioned between the plates, a roller journaled in the slider and positioned between said spaced rollers, said rollers positioned to receive a wire, resilient means for actuating the slider to urge the roller journaled therein against a wire extended through the rollers, and means for connecting the device to the ground.

3. In a saddle for grounding an electrical conductor being installed on poles and the like, the combination which comprises a C-clamp having upper and lower arms with an adjusting screw threaded in the lower arm and having spaced vertically disposed plates with elongated vertically disposed slots therein and with extensions at the sides extended upwardly from the upper arm, rollers journaled in the extensions of the plates, a U-shaped slider positioned between the plates and having vertically disposed arms extended upwardly from a base, a shaft journaled in the arms of the slider and extended through the slots of said plates, a roller positioned in the slider and mounted on the shaft journaled in the arms thereof, a spring adjustably mounted in the plates and attached to the base of the slider for urging the slider with the roller therein against a cable positioned on the rollers in the extensions of the plates, and means for connecting the saddle to the ground.

4. A wire support for use on the cross-arm of a pole comprising a pair of spaced parallel side plates, means for mounting the plates on a cross-arm of a pole with the plates extended upwardly from the cross-arm, spaced lower rollers mounted in a horizontal plane and positioned between the plates for supporting a wire, a slider positioned between the plates, an upper roller rotatably mounted in the slider and positioned in a vertical plane substantially midway between the lower rollers, resilient means connected to the slider and side plates for urging the upper roller against a wire trained over the lower rollers, means for adjusting the tension of the resilient means, and means for connecting the mounting means of the plates to the ground.

References Cited in the file of this patent

UNITED STATES PATENTS

| | | |
|---|---|---|
| 728,768 | Salisbury | May 19, 1903 |
| 1,603,517 | Christensen | Oct. 19, 1926 |
| 1,722,075 | Coon | July 23, 1929 |
| 2,188,715 | Ingram | Jan. 30, 1940 |
| 2,202,184 | Berger | May 28, 1940 |
| 2,264,856 | Peppard | Dec. 2, 1941 |
| 2,432,492 | Tinnerman | Dec. 9, 1947 |

FOREIGN PATENTS

| | | |
|---|---|---|
| 209,755 | Germany | May 14, 1908 |